(12) United States Patent
Tiwari et al.

(10) Patent No.: US 9,703,828 B2
(45) Date of Patent: Jul. 11, 2017

(54) SYSTEM AND METHOD FOR IDEMPOTENT INTERACTIVE DISPARATE OBJECT DISCOVERY, RETRIEVAL AND DISPLAY

(71) Applicant: Zumur, LLC, Greenville, SC (US)

(72) Inventors: Abhishek Tiwari, Princton, NJ (US); Jack Shedd, Chicago, IL (US); Brian William Wolter, New York, NY (US)

( * ) Notice: Subject to any disclaimer, the term of this patent is extended or adjusted under 35 U.S.C. 154(b) by 207 days.

(21) Appl. No.: 14/482,572

(22) Filed: Sep. 10, 2014

(65) Prior Publication Data

US 2015/0178395 A1  Jun. 25, 2015

Related U.S. Application Data (60) Provisional application No. 61/918,970, filed on Dec. 20, 2013.

(51) Int. Cl.
| | | |
|---|---|---|
| G06F 17/30 | (2006.01) | |
| G06Q 30/02 | (2012.01) | |
| G06Q 30/06 | (2012.01) | |
| G06Q 30/08 | (2012.01) | |

(52) U.S. Cl.
CPC .. *G06F 17/30412* (2013.01); *G06F 17/30693* (2013.01); *G06F 17/30864* (2013.01); *G06Q 30/0202* (2013.01); *G06Q 30/0625* (2013.01); *G06Q 30/08* (2013.01)

(58) Field of Classification Search
USPC ........................................................ 707/692
See application file for complete search history.

(56) References Cited

U.S. PATENT DOCUMENTS

| | | | | |
|---|---|---|---|---|
| 6,021,446 A | * | 2/2000 | Gentry, Jr. .............. | G06F 13/24 709/250 |
| 7,644,197 B1 | * | 1/2010 | Waldorf .................. | G06F 9/524 710/105 |
| 7,701,979 B2 | * | 4/2010 | Cho ........................ | H04L 12/52 370/503 |
| 7,747,638 B1 | * | 6/2010 | Loo .................. | G06F 17/30646 707/713 |
| 7,818,209 B1 | | 10/2010 | Lu | |
| 7,908,346 B2 | * | 3/2011 | Boykin ..................... | G06F 9/54 707/E17.117 |
| 8,301,764 B2 | | 10/2012 | Konig | |
| 8,359,301 B2 | | 1/2013 | Aziz | |
| 8,438,080 B1 | | 5/2013 | Xiao | |
| 9,578,130 B1 | * | 2/2017 | Nguyen .................. | H04L 49/90 |

(Continued)

*Primary Examiner* — Cam-Linh Nguyen
(74) *Attorney, Agent, or Firm* — McNair Law Firm, P.A.; Douglas W. Kim (57) ABSTRACT

The present invention is a system that performs a real time on-demand searching for items such as goods or services with specific search criteria, and returns a set of search results that are deduped and can be updated when modifications to the search results occur. The functionality is provided by a idempotence search system having a user agent that asynchronously receives search results from user's remote computing devices, a set of fetchers for retrieving search results from associated external site and organizing the results in a results queue, a plurality of parser operating in parallel, a broadcaster wherein the user agent includes retrieving the difference from the delta queue, retrieving the results associated with the difference and displaying the results for the user.

20 Claims, 8 Drawing Sheets

(56) References Cited

U.S. PATENT DOCUMENTS

| | | | |
|---|---|---|---|
| 2003/0172248 A1* | 9/2003 | Streltsov | G06F 9/30079 |
| | | | 712/21 |
| 2005/0228873 A1* | 10/2005 | Tapuska | H04L 51/26 |
| | | | 709/219 |
| 2006/0106708 A1* | 5/2006 | Abushaban | G06Q 40/04 |
| | | | 705/37 |
| 2008/0140577 A1 | 6/2008 | Rahman | |
| 2008/0140581 A1* | 6/2008 | Mayer | G06Q 30/0601 |
| | | | 705/80 |
| 2012/0123910 A1 | 5/2012 | George | |
| 2012/0259882 A1 | 10/2012 | Thakur | |
| 2012/0265736 A1 | 10/2012 | Williams | |
| 2013/0246498 A1* | 9/2013 | Zucknovich | H04L 67/2842 |
| | | | 709/201 |
| 2013/0346500 A1* | 12/2013 | Spencer | H04L 65/403 |
| | | | 709/204 |

\* cited by examiner

SYSTEM AND METHOD FOR IDEMPOTENT INTERACTIVE DISPARATE OBJECT DISCOVERY, RETRIEVAL AND DISPLAY

FIELD OF THE INVENTION

This invention is directed to a system and method for discovering, summarizing, computing, aggregating and displaying sourced object hierarchies in an orthogonal manner. Specifically, this invention relates to the needs of a person to discover and summarize information from disparate sources of information. Generally, it applies to the field of product search and consumer information.

BACKGROUND

Search engines are known in the art. However, these search engines lack significant features resulting in "hit-and-miss" results to the user. For example, a search for "Columbia Outerwear" can result in the user being presented with results for Columbia, South America or Columbia, S.C. Further, traditional search engines are a "one-and-done" methodology so that once the search is performed, additional results require an additional search. When the additional search is performed, the results from the first search are lost and therefore not integrated with the results from a second search.

The conventional method for producing stable object hierarchies from disparate sources is to craft three independent processes. The first, often called the "spider", crawls, or retrieves, large numbers of possible object sources, often in batch storing states for each source in aggregate. A second process is then initiated which summarizes the states of each source, storing an object state summary. Finally, a user-facing process is provided which allows a person to retrieve the object state summary based on identifiers preselected by the process. This method is inadequate for situations when sources cannot or should not be summarized or aggregated in the past. The architecture of the process is itself flawed, as sources which cannot be summarized in the past, for current retrieval, cannot then be retrieved, as the summary process is dependent on a large collection of objects to compare against when building a hierarchy.

Therefore, it is an object of the current invention to provide for a system that performs a real time on-demand, as well as batch based searching for goods or services with specific search criteria, and returns a set of search results that are deduped and can be updated when modifications to the search results occur.

SUMMARY OF THE INVENTION

The above objectives are accomplished by providing a system for preforming idempotence searches for consumer goods or services having a computer readable medium that includes sets of computer readable instructions comprising: a user agent that asynchronously receives a query request for a desired item, formats the query request into a get request and transmits the get request to a FIFO get request queue, wherein the query request includes search attributes; a set of fetchers for associating with an external site that retrieves the top get request from the get request queue, transmitting the get request to its associated external site, receiving the request from its associated external site and organizing the results in a results queue; a plurality of parser operating in parallel for removing results from the results queue and determining if a sequence of characters in the results maps to properties of the results and if so, placing the results in a FIFO object queue; a broadcaster for retrieving the results from the object queue, comparing the results to a history of the results that have been previously stored on the computer readable medium, determining the difference between the retrieved results and the stored results and placing the difference in a FIFO delta queue; and wherein the user agent includes retrieving the difference from the delta queue, retrieving the results associated with the difference and displaying the results for the user.

The invention can also include a plurality of fetchers wherein each fetcher is uniquely associated with an external site and each fetcher transmits its get request to the external site nearly simultaneously. The fetchers can await a predetermined period of time prior to placing the results on the results queue and then ceases receiving results from the external site. The broadcaster can update a date and time stamp associated with the results. The fetcher can delete duplicate results and determine a duplicate result by comparing the price and title contained within the result.

The fetcher can determine a duplicate result by comparing attributers of the results taken from the group consisting of: external site, description, title and price; and a determination can be made that if two attributes are identical then the results are deleted as duplicates.

A set of login instructions can be included that have a challenge question directed to demographic information about the user wherein the answer to the challenge question is associated with the user.

The user agent can compare the query request to a set of previously stored query request and displays results from the previously stored query requests if a match is found. The fetcher can be associated with a URL pointing to the external site.

DESCRIPTION OF THE DRAWINGS

The following description of the invention will be better understood reference to the following drawings that are incorporated and made part of the written specification.

DESCRIPTION OF THE INVENTION

Computer readable instructions, when executed by a computer processor, cause the computer to perform a series of steps to accomplish a specific task and results in useful, concrete and tangible results. These computer readable instructions can be tied to a particular machine or apparatus with the specific purpose of executing the computer readable code for accomplishing tangible results, and represents and accomplishes the manipulation of physical data.

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result when executed by a computer and its processor representing or resulting in the tangible manipulation of physical objects. These steps also require physical manipulations of physical quantities such as electrical or magnetic physical elements and are capable of being stored, transferred, combined, compared, or otherwise manipulated readable medium that is designed to perform a specific task or tasks. Actual computer or executable code or computer readable code may not be contained within one file or one storage medium, but may span several computers or storage mediums. The term "host" and "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by a set of computer readable instructions or code.

Elements of the flowchart support combinations of means for performing the special functions, combinations of steps for performing the specified functions and program instruction means for performing the specified functions. It will be understood that each block of the flowchart illustrations can be implemented by special purpose hardware-based computer systems that perform the specified functions, steps, or combinations of special purpose hardware or computer instructions.

The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

In one description of the invention, the following terms are used to refer to sets of computer readable instructions that, when executed by a processor of a computer, solve the technological problem of searching multiple unrelated sites for goods or services simultaneously within a predetermined period of time with task distribution balancing. The invention improves the functioning on the computer itself and the technological field of searching good and services for sale. The following sets of computer readable instructions are used in this specification: user agent, fetcher parser and broadcaster.

In the present invention, an architecture of connected systems works to produce a list of objects related to a query by a user. The query is parsed, producing an array of commands to be executed concurrently by the architecture. As the commands are executed, each system within the architecture produces a new state, or delta, which describes a change to the aggregate state of the system. As each delta is created, it is returned to two parties: the user who initiated the query, and a storage system which aggregates the delta together with all other deltas to produce a new state. The user is notified of each delta as its created, inclusive of the delta of the state produced by the storage system. The user's system in turn aggregates each delta to produce a new state specific for the user.

In one embodiment, the architecture is composed of six independent processes, each capable of executing independently and without regard to the requirement or state of any other process. Each process produces a delta, or summary of the difference between the previous state of the system and the new state of the system. Deltas are returned to any system which provides the producing system its initial command set.

In one embodiment, the process is initiated by a user agent, which provides a set of keywords, or query, or term, of which a user is expecting to discover objects related to that term from a set of prescribed but disparate sources. This user agent itself may be initiated in an on-demand fashion by a user or per a batch scheduled by the system. An example of keywords is shown in the following Table 1.

TABLE 1

| Description | Price |
| --- | --- |
| Title | URL |
| Vendor | Product Rating |
| User Rating | Distance from a Physical Location |

The query is transmitted to an originating system, which can translate the user's query into an array of commands in the form of HTTP GET request templates. The originating system places each command onto a queue, marking each as incomplete. The queue may or may not be singular in nature, as the originating system can opt at runtime to place the command on one or more queues, depending.

A second system, or fetcher, watches one or multiple queues for commands to be executed. A fetcher may be one or may be many, as the number of fetcher systems required to execute the given depth of commands on the queue may grow dependent on the depth of the commands. One or more fetchers will execute each command on the queue, producing a string of characters. The fetchers can reach to multiple source systems simultaneously and in real-time. The searching can be actual on-demand and in real-time from independent outside sources for any given query in contract to the current state of that which uses self-contained internal databases. This string is compared against previous strings the fetcher has produced for the given source and a delta of the string is produced. This delta is then transmitted to one or many queues.

The fetchers are independent objects that work asynchronously. Unlike traditional systems which house data internal to an environment and access that data when a consumer requests it and/or there's some other system process that requests it, the invention, through its fetchers, reaches out to a variety of external sites, all concurrently, with each fetcher going to a unique source on-demand and in real time and gathering results for the unique query. In one embodiment, the fetcher translates the query request from the user into a get request that can be sent to the external site. The request queue can be a first-in first-out (FIFO) get request queue. The fetcher's activities are driven by either, real-time, user queries or batch scheduled, system request. The query can include search attributes such as price range, desired price, tag, product or source. The source can be the vendor website or vendor computer system. The request query can include an expiration where the user states a period of time where the user is willing to purchase the time frame the desired price or a certain price range.

Upon either type of request, the system spawns a fetcher for each source provider/external source or vendor and the fetchers immediately go out, submit, gather, and return results to the system. Upon return of results, each set is analyzed by a unique parser (e.g. one parser per source engine), another system component. All parsers act in parallel and each parser deconstructs and normalizes its unique set of results for uniform presentation of all results in parallel to the user.

A third system, or parser, watches one or multiple queue, such as results queues, for commands to be executed. These commands take the form of string deltas. The parser, which may be one or may be many, examines the string delta, reconstructing a complete string from the delta history of its records, analyzing the resulting string for a sequence of characters which may or may not map to the properties of an object, depending on the construction and contents of the string. The system may produce one or many objects from the command. Each object is placed onto one or many queues.

A fourth system, the broadcaster, watches one or many queues for objects. Each object is retrieved from the queue such as the object queue, and compared against the system's history of all objects, and a delta is produced for that object. A null may be produced if the object has no difference from past objects. When a non-null delta is produced, the delta is placed on one or many queues. In one embodiment, the delta is placed on a FIFO delta queue.

A fifth system, the storage, watches one or many queues for new object deltas. Each delta is retrieved from the queue and compared against the current state of the storage system producing a delta of the differences. This delta is placed in permanent storage. The storage platform places a message on one or many queues describing the current state of the system.

The sixth system, the user client, watches one or many queues for state change messages. These messages are translated into an object set which can be displayed to the user as a list of objects related to their originating term.

This process occurs out of order across numerous simultaneous originating queries, for as many users as have access to the system. Each step of the process is performed atomically, and each step works on the smallest possible amount of data necessary to produce the appropriate delta.

Following is an embodiment that is described by a series of computer readable instructions that, when executed by a computer, perform the following functionality. The steps are listed in linear fashion, but can also be executed parallel to each other and in multiple instances and on a single server or across several servers. The computer readable instructions provide a computer implemented method performed across a series of server systems comprising: (a) an originating service or server receiving a user command; (b) a collection of independent services or servers which perform distinct, atomic operations on a set of data related to the user query; (c) a decoupled system for storing or acting as a queue independent of connection or association with any specific server or service; (d) receiving a command which is translated from a single command or request into multiples of that command for disparate systems; (e) passively transmitting the command set to the items of element (c) through the use of element (b); (f) which acts on the command in an unranked system in parallel to other commands; (g) which acts on the command automatically; (h) which computes deltas for state changes within each system of element (b) without comparing or analyzing any state of any other system within element (b); (i) which produces, in aggregate, a delta of an overall system change in aggregate from all deltas produced from all systems of element (b); and (j) which transmits each delta upon its calculation both to a user and to a permanent storage system.

When a user creates an account with the current invention, the user can enter information such as shown in Table 2.

TABLE 2

| USER NAME | String |
| PASSWORD | String |
| CHALLENGE QUESTION | String |
| DEMOGRAPHICS (Age, Gender, etc.) | Integer/String |
| CHALLENGE QUESTIONS (Pre-Determined) | String |

In one embodiment, demographics are discovered directly from the user in the form is direct questions. For example, when creating an account, the user can be prompted to answer the questions "What is your age?". In one embodiment, demographics can be determined from answers to Challenge Questions. For example, if the Challenge Question is "What is the name of the oldest child?". It is known that the user has at least one child. This information can be used to determine specific attributes of the user.

Figure 1:
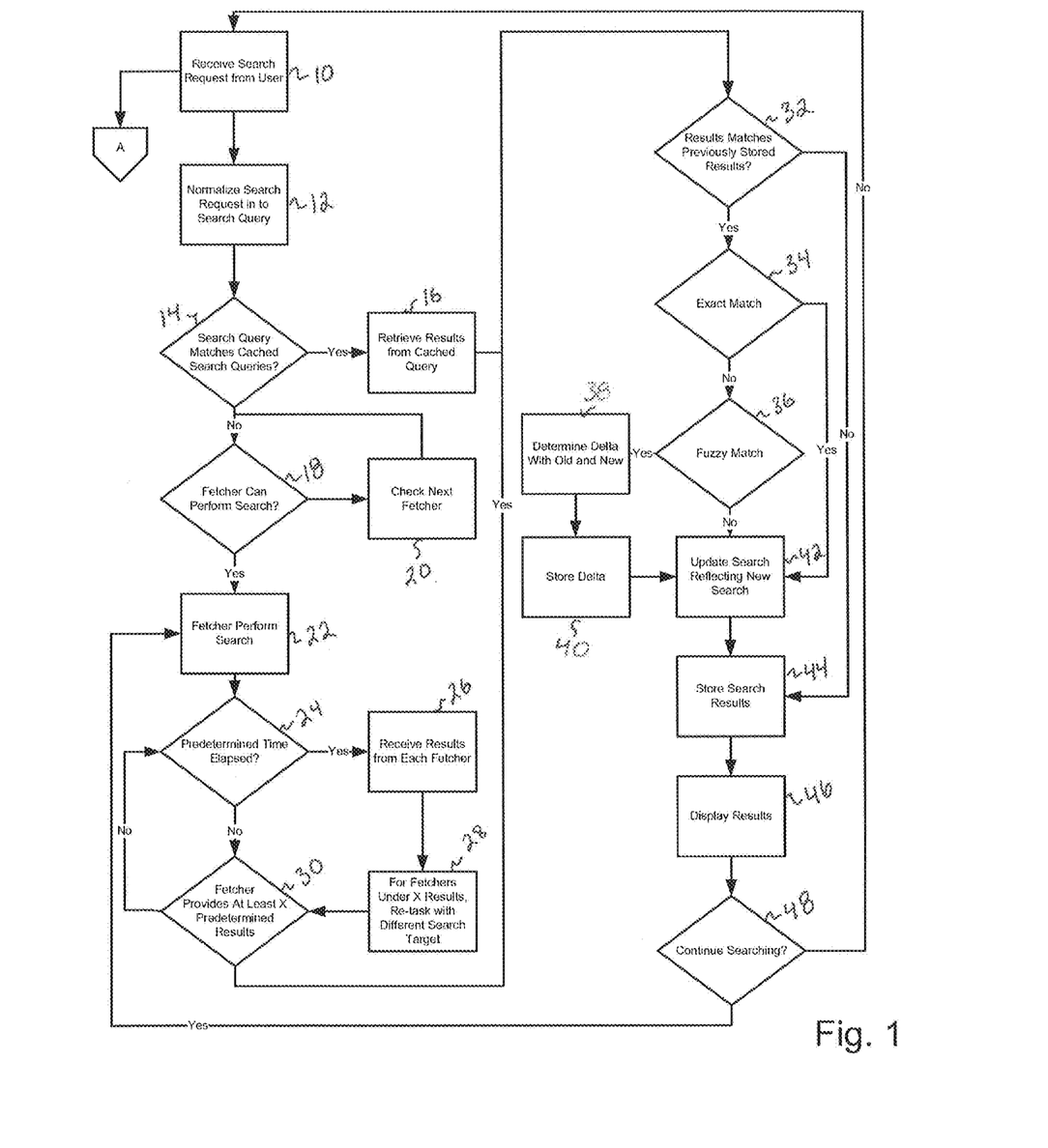
FIG. 1 is a flow chart of the functional flow of invention.

Referring to FIG. 1, the process is initiated when a user enters a search request which is then received at 10 by a set of computer readable instructions on a server that when executed by a processor preforms certain functions. The search request is then formatted into a string and the string can be normalized at 12. A determination can be made at 14 whether the search request matches a search request previously entered by any user that was previously cached at 14. If a match is found, the results from the previously received search request are retrieved from cache at 16 and the search request is marked as completed or preformed. If the current search request is not discovered in cache, the search request needs to be performed.

In one embodiment, there are a plurality of fetchers that can perform searches. The computer readable instructions have the ability to periodically check which searches need to be performed and whether the particular fetchers can perform the search at 18. The determination whether the fetchers can perform the search is made by computer readable instructions. If the fetcher cannot perform the search, the next fetcher can then make a determination if it can perform the search at 20.

If the fetcher can perform the search, the fetcher performs the search targeting to the URL that is currently associated with the particular fetcher at 22. A determination is made at 24 whether a predetermined period of time has elapsed such as a predetermined number of milliseconds that, in one embodiment, is less than 1000. If the period of time has elapsed, the results that the fetcher has retrieved from the third party location are received at 26. If the fetcher has not retrieved a specific number of results, it is an indication that the fetcher is underutilized and the fetcher can be re-tasked to look for results at a second URL at 28. If the fetcher does return a predetermined number of results (a sufficient number of results) as determined at 30, the results are matched with previously stored results at 32.

By using a plurality of fetchers, the invention can search multiple sites in parallel, receive results in a non-linear communication, and optimize searching resources by re-tasking fetchers that do not retrieve a sufficient number of results due to such results either not being available from the third party URL or if the third party URL is experiencing technical difficulty or for some other reason that a predetermined set of results are not found. By way of example and not limitation, the following is a specific example of one possible outcome and functional flow of the invention.

A user wishes to search for a SONY Television, priced around $500, with a 27 inch screen in LED. A first fetcher searches for results matching these criteria at URL Amazon.com; a second fetcher looks for results from URL bestbuy.com. When each fetcher discovered 50 results or a predetermined period of time elapses, the fetchers retrieve the results; the results are deduped and formatted for display to the user. This process provides for quick access to multiple sites for goods and services in parallel without a linear presentation of search results to the user.

When search results are received from one or more fetchers, the results can be matched to previously stored results for the same or similar search request at 32. If there is an exact match found at 34, the search results are updated with a current time stamp. If the comparison of search results does not result in an exact match, a determination is made whether there is a fuzzy match at 36. In one embodiment, a fuzzy match is when two terms of the following parameters match for two discovered items: URL source, Good or Service Descriptions, Good or Service Title and Price. For example, if the attributes of item 1 are "SONY TELEVISION, This is a 27 inch LED Sony Television Flat Screen, bestbuy.com and $389.99" and item 2 is shown as: "SONY, This is a 27 inch LED Sony Television Flat Screen, hggreggs.com, $389.99" a fuzzy match is determined to have been made as the Description and Price are identical indicating that these items are the same and therefore potentially duplicates. A search engine that is the source of information for the present invention is not necessarily the seller of the product. If the search engines targeted by the fetcher provide a title, price, and end seller match then the result is considered a duplicate. If the price and title match from different search engine sources but the seller is different between them, then the results are not deemed duplicates.

If a fuzzy match is determined, the differences are determined at 38 and the information is stored at 40. The search results are updated to remove duplication at 42 and the results are stored at 44. The results are displayed to the user at 46 and a determination is made whether to continue searching, according to user input, at 48. The user can be satisfied with the search results or can rerun the search request or initiate a persistent search that will inform the user when new items (or existing items are modified) to fall within the range of interest of the user. For example, the user may wish to initiate a persistent search for television that is a SONY 27 inch screen and fall under $350 in price. When results are discovered by a persistent search agent, which run periodically, the user can be notified through SMS messaging, text, email or other means.

Figure 2:
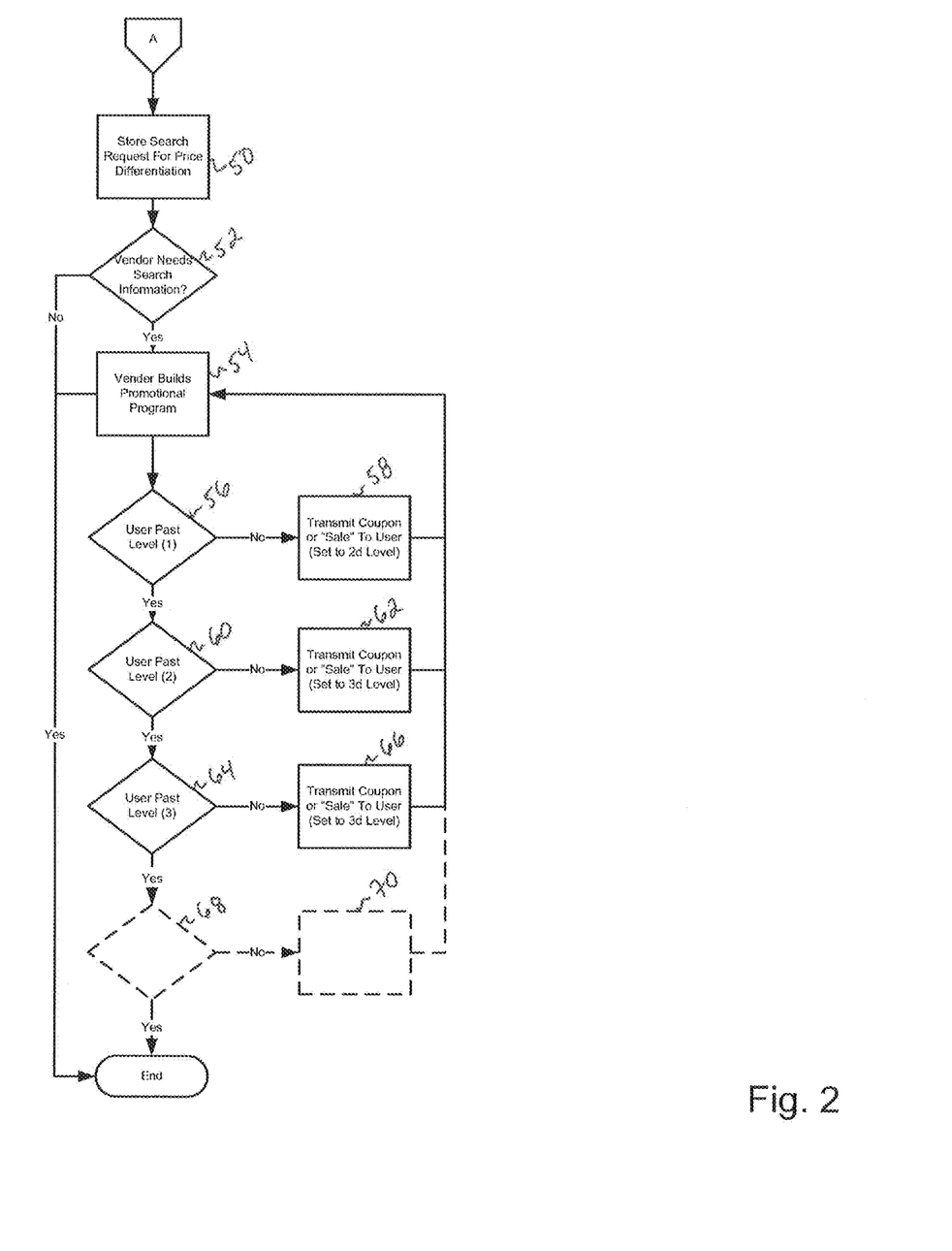
FIG. 2 is a flow chart of the functional flow of the invention.

Referring to FIG. 2, another advantage of the current system is described. Once a user enters a search, including a persistent search, the user is inherently providing an indication that the user would be willing to purchase the described goods or services at or near the price or price range included in the search criteria. Therefore, an indication is given of the willingness and price point of the goods from that user prior to the user actually making a purchase decision. To restate this, a demand curve can be calculated for a good or service using information from potential purchasers based upon the willingness to search for goods or services at a particular price or price range. For example, the following demand can be calculated based upon information from users when requesting searches as shown in Table 3.

TABLE 3

| Price | Quantity of Total Users | Percentage |
|-------|------------------------|------------|
| $10   | 200                    | 36         |
| $20   | 145                    | 26         |
| $30   | 110                    | 19         |
| $40   | 100                    | 18         |

Additionally, with this information, there is an opportunity for the sellers/vendors/suppliers of the particular good/service or comparable or substitute good/service to liquidate an inventory, but advantageously using this information for differential pricing. The seller can determine if there is market information, such as demand curve information, at 50 of FIG. 2. The vendor can decide to use demand information at 52. Assuming that the vendor has good/service to liquidate, the vendor can develop a sales program that contains stages at 54. Initially, and with the aid of the demand information, the seller can determine to provide a coupon, special sales price or other incentive for the goods at the $40 price point for one user and a $36 price point for a second user. This could take several forms such as a 10% coupon for the first user for a good priced at $44 and a 20% coupon for the same good for the second user, a reduced price for a limited period of time, etc. Effectively providing two different coupons uniquely targeted to each of the users which result in a price reduction equal to that specific user's willingness to pay for that good.

Demand data is aggregated and used to determine a "willingness to pay" to produce insight into consumer market behavior. Couponing is then used according to the individual user's willingness to pay to align specific products at the price levels that specific user is willing to pay. The ability to gather, analyze, and present demand data is unique to this invention. When a user initiates a saved search and enters in their willingness to pay for an item they have effectively identified individual demand for a product. Based on the size of the sample, that data in its aggregate provides a statistically viable demand for that product or category. By way of example and not limitation, for product X, with retail value of $10 you have five users (denoted as User 1 through 5) who have set up a persistent search for that product. User 1 through 5 set prices of $9.00, $7.50, $5.00, $4.00 and $2.00 respectively. This data is used to generate a demand curve for product X. In this example at price point of $9.00, a quantity of 1 unit will be sold, at price point of $8.00, again, a quantity of 1 unit will be sold (e.g. User 1), at price point of $7.00 a quantity of 2 units will be sold (e.g. User 1 & User 2), at price point of $6.00, again, a quantity of 2 units will be sold (e.g. User 1 & User 2 again), at price point of $5.00 a quantity of 3 units will be sold (e.g. User 1, User 2, & User 3), at price point of $4.00 a quantity of 4 units will be sold (e.g. User 1, User 2, User 3, and User 4) and so on and so forth as shown in the following table and graph:

| Price  | Qty |
|--------|-----|
| $9.00  | 1   |
| $7.50  | 2   |
| $5.00  | 3   |
| $4.00  | 4   |
| $2.00  | 5   |

The sales program can be transmitted to the server containing the computer readable instructions. The computer readable instructions then can transmit the coupon, program price or other information to users that are associated with the demand information. In the first pass determined at 56, the users are provided the program information at 58 and decide to purchase goods or services given this program price or coupon for a predetermined period of time. Therefore, the seller seeks to sell the most goods as possible at the highest price of the demand information. At the second pass at 60, the seller can lower the purchase price (or increase the coupon amount or discount) to attempt to capture the purchases that are at the next lowest price at the demand levels. The discount or coupon is passed to the potential purchaser at 62 and the user is provided the opportunity to purchase for a predetermined period of time at 62. Therefore goods or services are sold at the next lowest level. A third stage at 64 and 66 can also be provided for the next lower level of the demand levels. This lowering of the price (or raising of the discount or coupon amount) can be repeated as shown by 68 and 70 till either the program is over, the inventory is liquidated, or some other termination event represented by 72.

Figure 3:
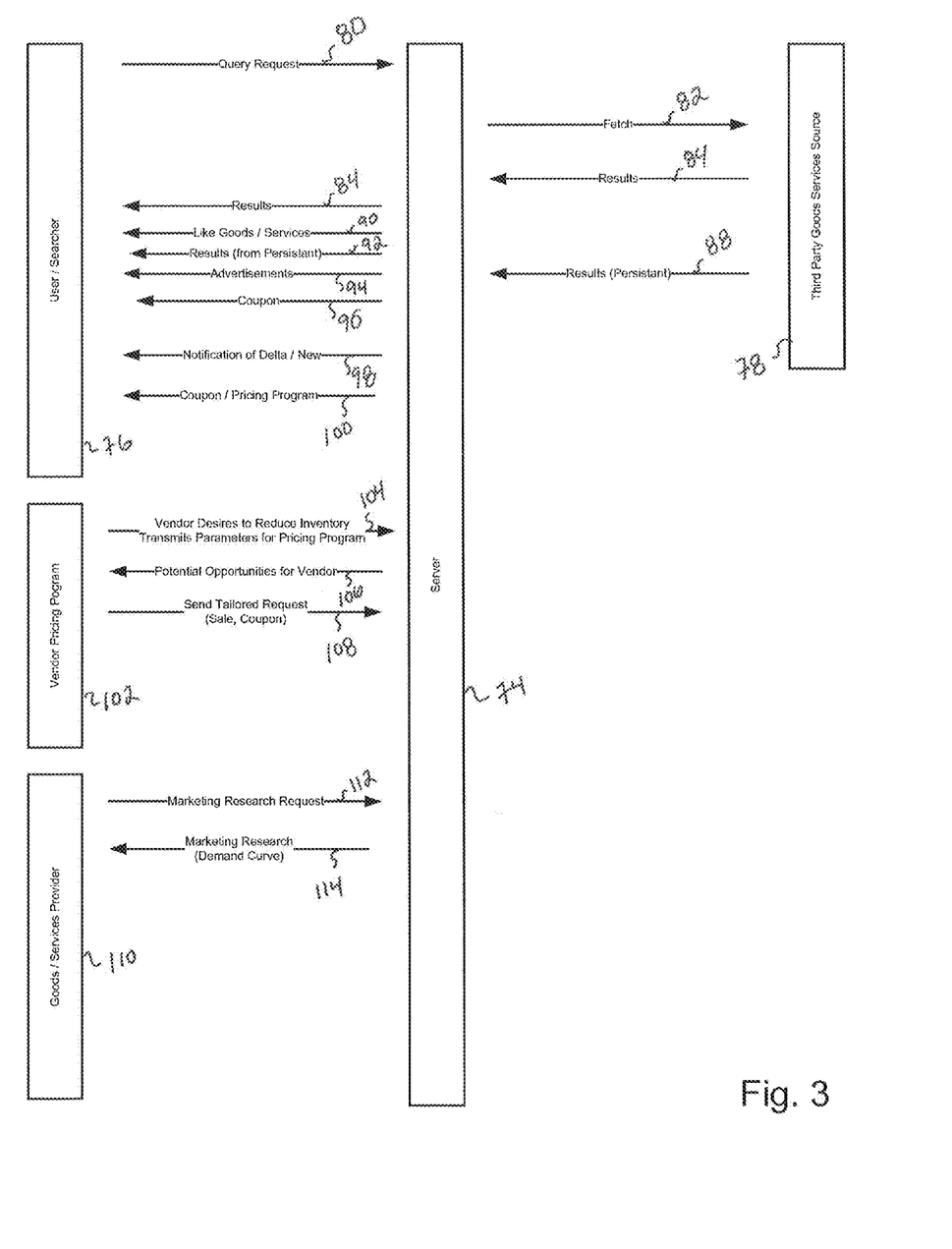
FIG. 3 is a schematic of the functional flow and data flow of the invention.

Referring to FIG. 3, a schematic of the invention is shown. A user having access to a user interface provided by computer readable instructions on a server, such as a SaaS, ASP, or other model, can enter search requests and receive purchase opportunities and search results at 74. Information is transmitted between the user computer and the server 76 that contains computer readable instructions, a compute readable medium and is in electronic communications with the user computer and third party sites, external sites, (URL) or servers (Amazon.com, BestBuy.com, etc.) represented by 78. The user causes a search request 80 to be transmitted to the server. At least one fetcher 82 connects with the third party and retrieves results 84 that are directly associated with the current search or results from a persistent search 86. The results are normalized and displayed to the user at 88. The search results can also return not just the goods that were direct matches to the search request, but can include results 90 like, comparable or substitute goods or services to the user. Persistent results 92 can be displayed to the user periodically or as scheduled or requested by the user. Based upon the search request, advertisements 94 that are specifically selected for the user can be presented/displayed to the user. Coupons 96 or 100 can be provided to the user both based upon the information collected from the user as well as at the request of sellers/vendors. No personal identifying information need be shared with sellers or vendors to provide this functionality. When a good or service changes (e.g. a price drops), this information 98 can be provided to the user either on request or as a periodic function based upon the users wishes.

When a vendor computer 102 accesses the server, the vendor can receive demand information 104 that can be used by the vendor for a specific pricing or sales program such as when attempting to liquidate inventory. The server can also transmit pricing and sales opportunities to the vendor at 106. The seller or vendor can transmit a pricing program (coupons, discounts, one time sales prices, etc.) 108 to the server.

The information gathered from the server can also be used by a third party such as marketing research companies 110. Such companies or entities can request marketing information 112 and receive such information at 114. Marketing information can include buying habits, produce search numbers and information, length of search effort by user, purchase prices, search criteria and the like.

Figure 4:
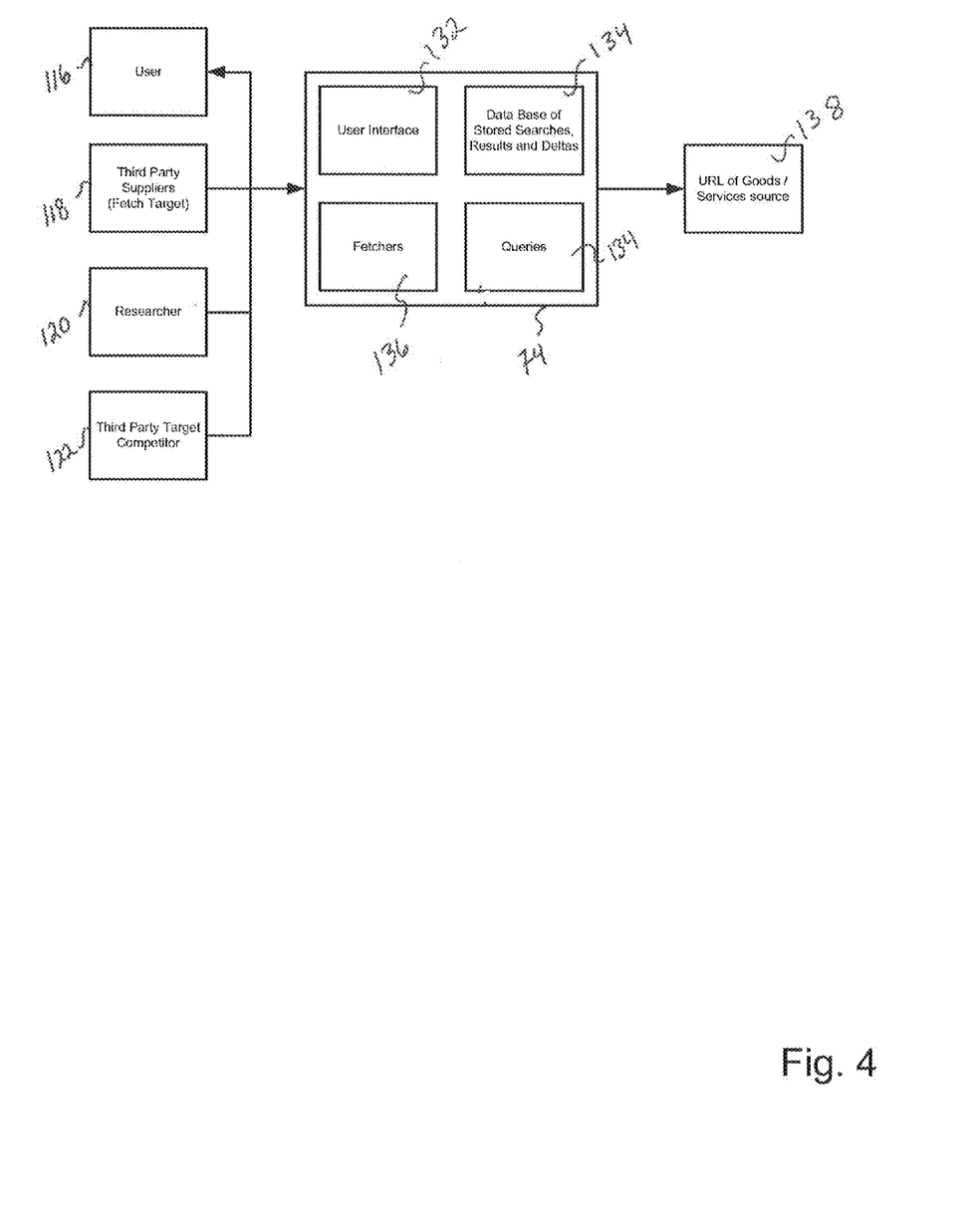
FIG. 4 is a schematic of components of the invention.

Referring to FIG. 4, various components of the present invention are described. Through electronic communications, user computer 116, third party suppliers/sellers/vendors computer 118, market research entity computer 120 and third party seller/competitors computer 122 can communicate with server 124. The server can include a computer readable medium, computer storage and computer readable instructions that, when executed by a processor, included with the server, perform the functionality of the invention. The computer readable instructions can include a user interface 132, database of stored searches, queries, and deltas 134, fetchers 136 and demand/market data 138. The server can be in communications with a plurality of third party sources for discovered goods and services 140.

Figure 5:
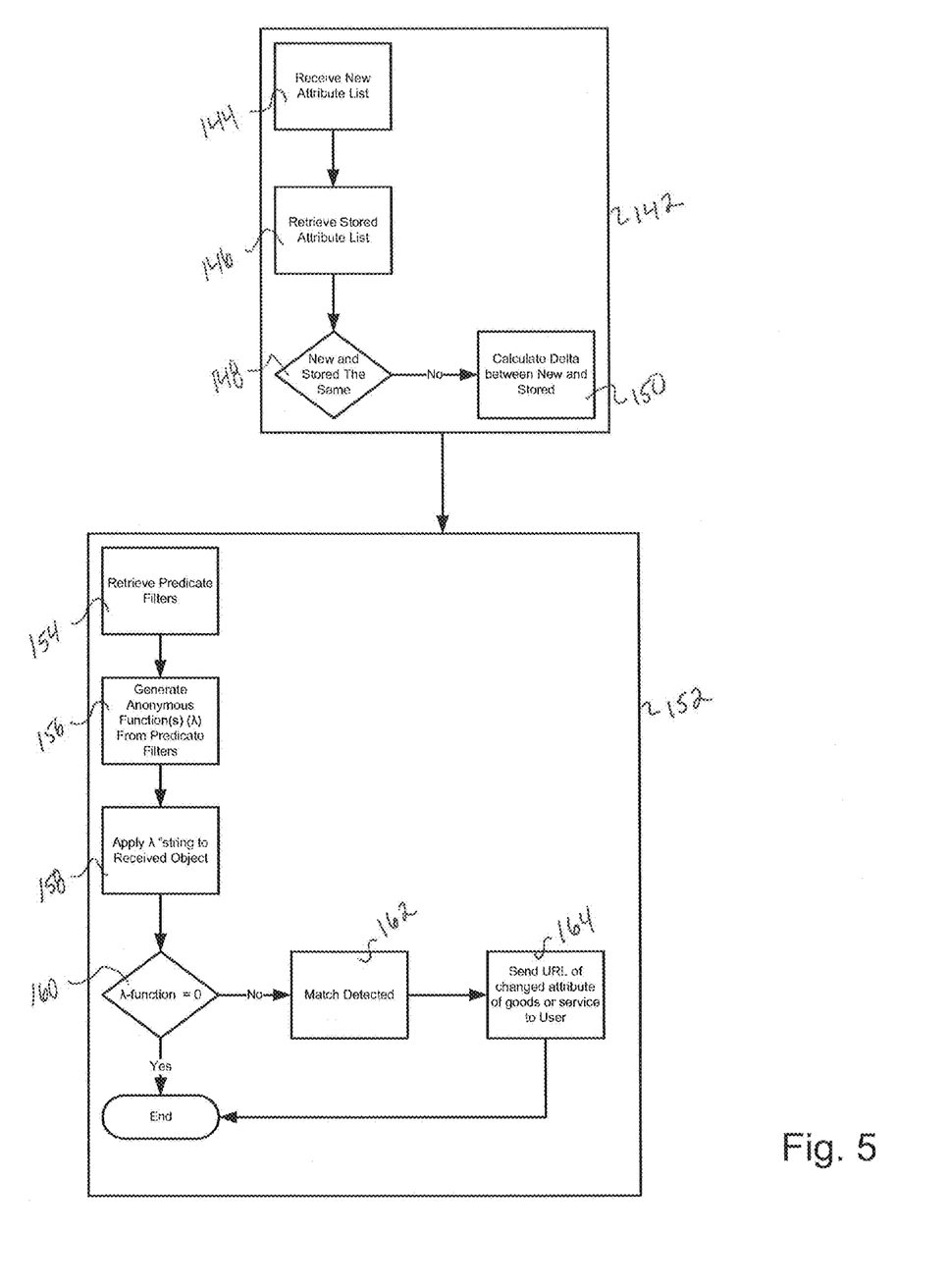
FIG. 5 is a flowchart of aspects of the invention.

Referring to FIG. 5, one aspect of the invention is described. A first process 142 is initialed that includes an attribute list of an object; objects can include search results. The attributes of the object can be unique to that object and need not be predefined in the computer readable instructions, but can be created on-the-fly. The attributes of the object are retrieved from the server at 144. At 146, an attribute list for the object that has been previously stored is retrieved. A determination whether the new attribute list and the stored attribute list are the same is made at 148. If there is a difference between the new and stored attribute list, the delta is calculated at 150 and stored.

A second process is then initiated at 152 by the first process. The second process retrieves predicate filters for the attribute list at 154. For example, filters can include price levels, quantity, brand information, shipping location and the like. A set of anonymous functions ($\lambda$s) are generated in memory from the predicate filters at 156. In this embodiment, the $\lambda$s are generated in real time and stored on temporary memory rather than being specifically included in the computer readable instructions providing for significant speed in operation and flexibility to generate $\lambda$s as needed. Therefore, the $\lambda$s need not be predetermined prior to the execution of the computer readable instructions. An object with these attributes are then processed by the $\lambda$s at 158. If the $\lambda$s return a non-zero result at 160, a match is detected at 162 and the user can be notified of the URL where the change has been detected at 164. For example, if the price drops to a certain level, the user can be notified.

Figure 6:
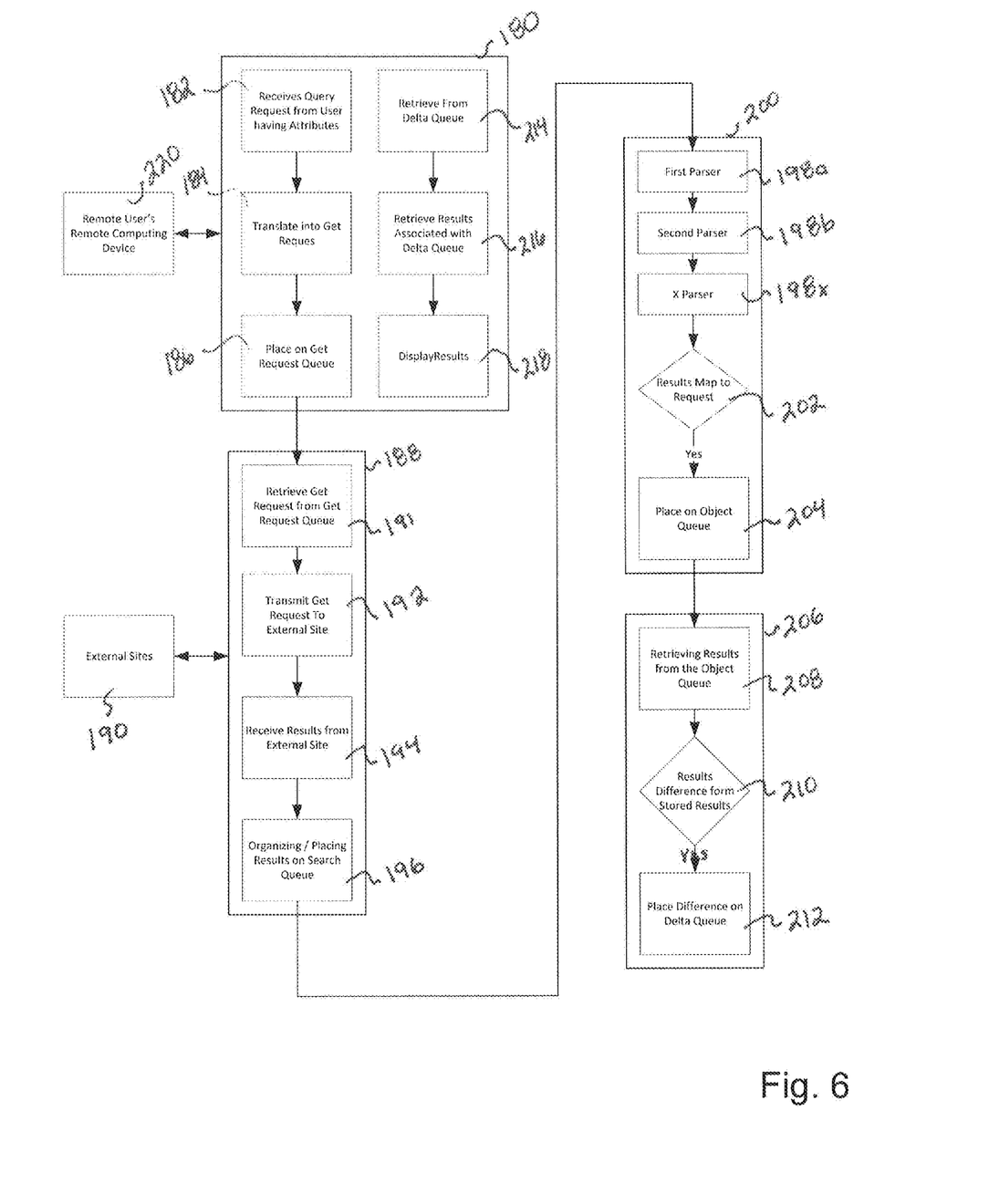
FIG. 6 is a flowchart and diagram of the invention; and,
FIGS. 7 and 8 are diagrams of the aspects of the invention.

Referring to FIG. 6, the invention is shown in more detail. A user agent 180 can asynchronously receive a query request for a desired item at 182. It can then format the query request at 184 into a get request and transmits the get request to a FIFO get request queue at 186. The query request can include search attributes such as item description, price, price range, quantity desired or other desired criteria from the user. The user agent includes retrieving the difference from the delta queue at 214, retrieving the results associated with the difference at 216 and displaying the results for the user at 218 on the user's remote computing device 220.

Figure 7:
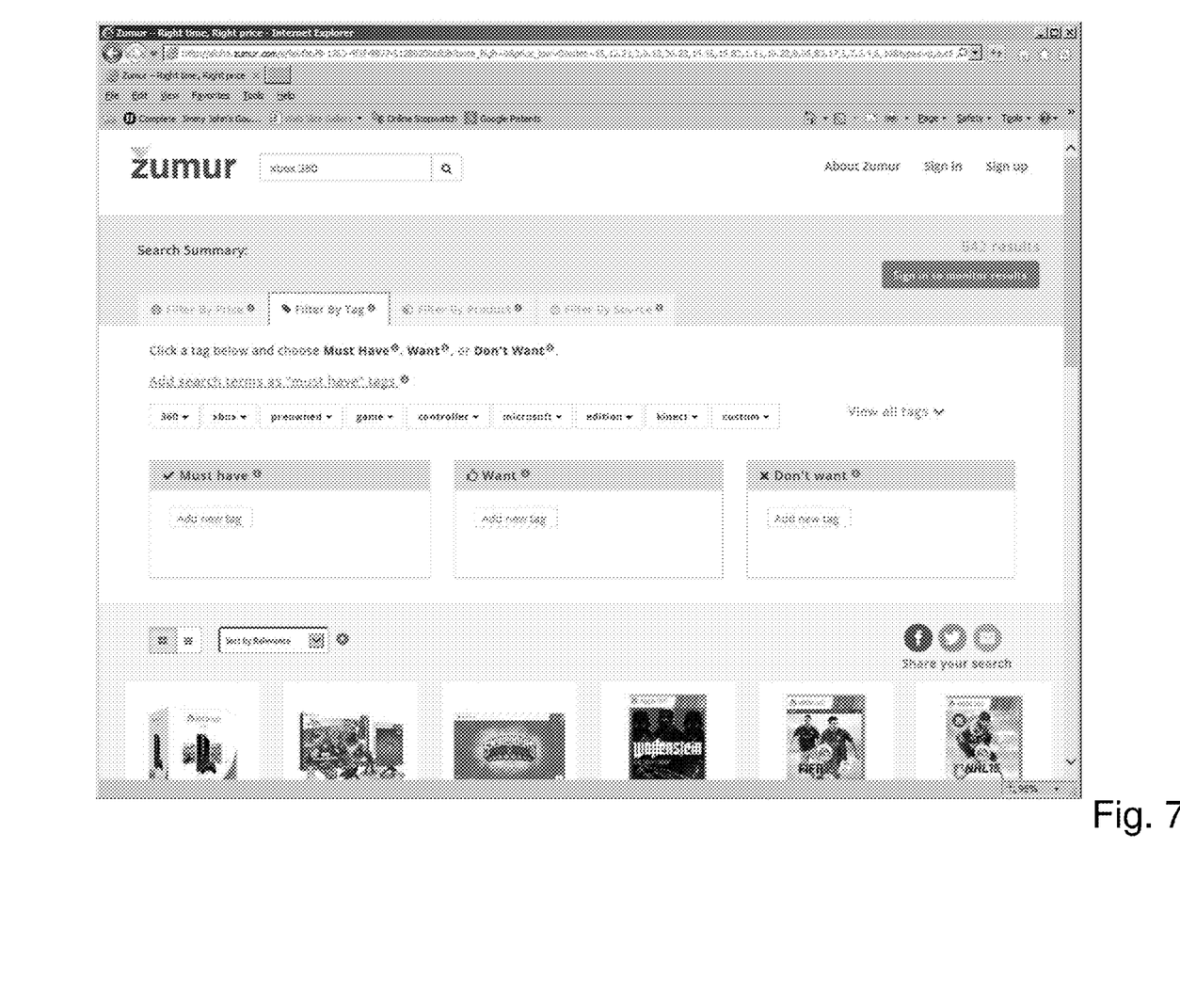
Figure 8:
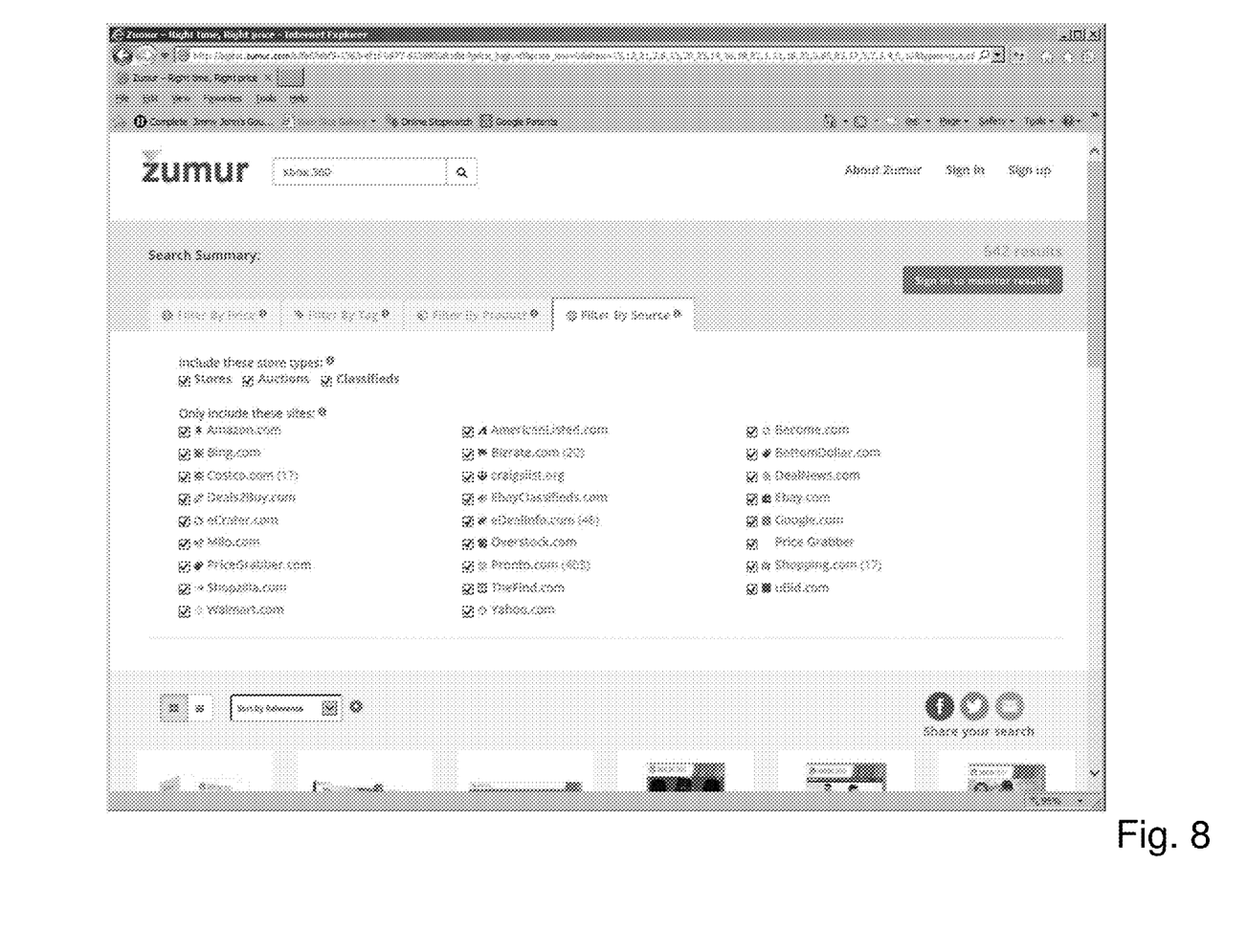

The user agent can also analyze the search request and the search results and extract tags from the content of the search results. For example, when searching for a consumer good such a video game, the tags that can be extracted from the results can include 360, xbox, preowned, game, controller, Microsoft, edition, Kinect and custom. From each of the tags, the designation of must have, want and don't want can be associated with each tag to further filter the results. FIG. 7 is an example of the tags selection functionality. A filter by source can be included to either include or exclude external site. FIG. 8 is an example of the external site selection functionality.

A set of fetchers 188 can be associated with an external site 190 that retrieves the top get request from the get request queue at 191, transmitting the get request to its associated external site at 192, receiving the request from its associated external site at 194 and organizing or placing the results in a results queue at 196. The fetchers can transmit to their respective external site simultaneously to provide for rapid results from multiple sites. In one embodiment, the results are returned in 10 millisecond or less. In one embodiment, the results are displayed to the user in under 10 second and can be displayed to the user in under 2 seconds. If the fetcher does not receive results in a predetermined period of time, the fetcher can cease accepting results from the external site so as not to delay the process of searching.

The invention can include a main parser 200 including plurality of parser 198a through 198x operating in parallel for removing results from the results queue and determining if a sequence of characters in the results maps to properties of the results at 202 and if so, placing the results in a FIFO object queue at 204. A broadcaster 206 can be included for retrieving the results from the object queue at 208, comparing the results to a history of the results that have been previously stored on the computer readable medium, determining the difference between the retrieved results and the stored results at 210 and placing the difference in a FIFO delta queue at 212.

It is understood that the above descriptions and illustrations are intended to be illustrative and not restrictive. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A system for performing idempotence searches for consumer goods or services having a computer readable medium that includes sets of computer readable instructions comprising:
    a user agent that asynchronously receives a query request for a consumer good, formats the query request into a get request, and transmits the get request to a FIFO get request queue, wherein the query request includes search attributes, wherein the query request is removed from the get request queue upon expiration of a time frame representing when the user is willing to purchase a desired item;
    a set of fetchers wherein each fetcher in the set of fetchers operates asynchronously to other fetchers and is associated with a unique external site retrieves the top get request from the get request queue for, transmitting the get request to its associated external site, receiving the results from its associated external site, organizing the results in a results queue, determine whether a fetcher in the set of fetchers has received a specific number of results in a predetermine prior of time and, if not, associating the fetcher with a second external site, transmitting the get request to the second external site and receiving the results from the second external site, storing the results in the results queue;
    a plurality of parser operating in parallel for removing results from the results queue and determining if a sequence of characters in the results maps to properties of the results and if so, placing the results in a FIFO object queue;
    a broadcaster for retrieving the results from the object queue, comparing the results to a history of the results that have been previously stored on the computer readable medium, determining the difference between the retrieved results and the stored results and placing the difference in a FIFO delta queue if a difference exists; and, wherein the user agent includes retrieving the difference from the delta queue, retrieving the results associated with the difference and displaying the results for the user.

2. The system of claim 1 including a plurality of fetchers wherein each fetcher is uniquely associated with an external site and each fetcher transmits its get request to its associated external site nearly simultaneously.

3. The system of claim 1 wherein the fetcher awaits a predetermined period of time prior to placing the results on the results queue and then ceases receiving results from the external site.

4. The system of claim 1 wherein the broadcaster updates a date and time stamp associated with the results.

5. The system of claim 1 wherein the fetcher deletes duplicate results.

6. The system of claim 5 wherein the fetcher determines a duplicate result by comparing the price and title contained within the result.

7. The system of claim 5 wherein the fetcher:
    determines a duplicate results by comparing attributers of the results taken from the group consisting of: external site, description, title and price; and
    a determination is made that if two attributes are identical then the results are deleted as duplicates.

8. The system of claim 1 including a login having a challenge question directed to demographic information about the user wherein the answer to the challenge question is associated with the user.

9. The system of claim 1 wherein the user agent compares the query request to a set of previously stored query request and displays results from the previously stored query requests if a match is found.

10. The system of claim 1 where each fetcher in the set of fetchers is associated with a URL pointing to the external site.

11. A system for performing idempotence searches for items comprising:
    a server having a computer readable medium, processor, in electronic communication with a user's remote computer device and a plurality of remote external computer systems associated with goods offered for sale having:
    a set of computer readable user agent instructions stored on the computer readable medium that receives a query request from a user associated with a desired good or service from the user's remote computer device, formats the query request into a get request and places the get request on a FIFO get request queue, wherein the query request includes a target and search attributers;
    a plurality of sets of fetcher instructions stored on the computer readable medium wherein each set of fetcher instructions operates asynchronously to the other sets of fetcher instructions and is associated with a unique remote external computer system, wherein each set of fetcher instructions retrieves a top get request from the request queue, transmits the get request to the remote external computer system associated with it, receives the results representing discovered items in response to the get request from the remote external computer system and places the results on a FIFO results queue;
    a set of computer readable parser instructions stored on the computer readable medium uniquely associated with the remote external computer system associated with a set of fetcher instructions that removes the results from the results queue and determines if a sequence of characters in the results matches the properties of the results and if so, places the results on a FIFO object queue;

a set of computer readable broadcaster instructions stored on the computer readable medium for retrieving results from the object queue, comparing the results to a history of the results previously stored, determining the difference between the retrieved results and the stored results, and placing the difference on a FIFO delta queue; and, wherein the set of computer readable user agent instructions includes instructions for retrieving the difference from the delta queue, retrieving the user results associated with the difference and displaying the user results for the user.

12. The system of claim 11 wherein the set of user agent instructions include instructions for receiving filter criteria from the user's remote computer device, determining if an item in the results is within the filter criteria and displaying the items in the results that are within the filter criteria.

13. The system of claim 12 where in the filter criteria are selected from the group consisting of: price, tag, product description and item source.

14. The system of claim 12 wherein the set of user agent instructions include instructions for determining a set of tags from the results and displaying the tags to the user.

15. The system of claim 14 wherein the set of user agent instructions include instructions for associating status to each tag wherein the status is selected from the group consisting of: must have, want and don't want.

16. A system for performing idempotence searches for items comprising:

a server having a computer readable medium and processor wherein the server is in electronic communication with a user's remote computer device and a plurality of remote external computer systems associated with items offered for sale; and, a set of computer readable instructions stored on the computer readable medium that, when executed by the processor provide for: receiving a query request from the user's remote computing device representing a desire of the user to search for a particular item at a desired price, formatting the query request into a get request having a target and search attributes, placing the get request on a FIFO get request queue, launching a plurality of fetchers, wherein each fetcher is associated with a remote external computer system, wherein each fetcher retrieves a top get request from the request queue, transmitting the get request to the remote external computer system associated with the fetcher, receiving the results of the get request from the remote external computer system and placing the results on a FIFO results queue, retrieving the results from the results queue, determining if a sequence of characters in the results matches to properties of the results and if so, placing the results on a FIFO object queue, retrieving the results from the object queue, comparing the results to a history of the results previously stored, determining the difference between the retrieved results and the stored results, placing the difference on a FIFO delta queue, retrieving the difference from the delta queue, retrieving the results associated with the difference, and providing the user results and deltas.

17. The system of claim 16 wherein the set of computer readable instructions include instructions for creating the FIFO get request queue, the FIFO object queue, the results queue, the FIFO object queue and the FIFO delta queue.

18. The system of claim 16 wherein the fetcher is associated with a URL pointing to one of the external sites offering the item for acquisition.

19. The system of claim 16 wherein the fetcher awaits a predetermined period of time prior before retrieving the results from the external site and ceases accepting results from the external site once the predetermined period of time has elapsed and the fetcher is associated with a second external site, transmits the get request to the second external site and receives the results from the second external site.

20. The system of claim 16 wherein the set of computer readable instructions includes instructions for:

receiving filter criteria from the user's remote computer device, determining if an item in the results is within the filter criteria, displaying the items in the results that are within the filter criteria wherein the filter criteria are selected from the group consisting of: price, tag, product description and item source, determining a set of tags from the results, displaying the tags to the user, and, associating a status to each tag wherein the status is selected from the group consisting of: must have, want and don't want.

* * * * *